Nov. 14, 1961   J. HREBICEK   3,008,327
APPARATUS FOR DETERMINING STATIC AND DYNAMIC UNBALANCE
Filed June 20, 1957   2 Sheets-Sheet 2

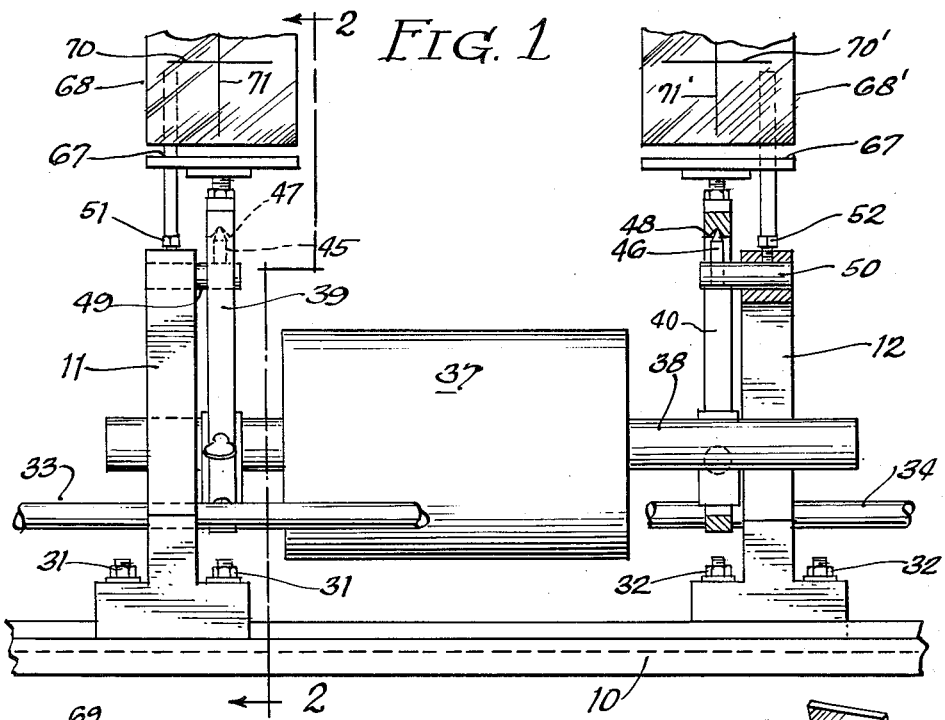

INVENTOR.
James Hrebicek
BY Charles F. Vrytech
Attorney

United States Patent Office 3,008,327
Patented Nov. 14, 1961

3,008,327
APPARATUS FOR DETERMINING STATIC
AND DYNAMIC UNBALANCE
James Hrebicek, Chicago, Ill.
(2327 S. 61st Ave., Cicero, Ill.)
Filed June 20, 1957, Ser. No. 666,960
7 Claims. (Cl. 73—66)

This invention relates to apparatus for determining static and dynamic unbalance in a rotatable element.

In balancing machines as presently designed, although static balancing can be achieved while the element to be balanced is free to turn to seek its own position of equilibrium, dynamic balancing is effected by rotating the element rapidly and then observing the magnitude and location of the excursion of the element from the geometric center of rotation of the element. The observance of the excursion may be accomplished through mechanical, optical or electronic means, but it is necessary to mount the element to be balanced on a rotatable support and then drive the element, either by a belt or some other means, which is costly and in addition may introduce an error in the ultimate result.

It is an object of this invention to provide a balancing machine for the dynamic balance of rotatable elements which does not require that the elements be driven to make such unbalance apparent.

Another object of this invention is the provision of a balancing machine for determining the amplitude and location of dynamic unbalance in a rotatable element wherein a simple optical system may be used for such determination.

A further object of this invention is the provision of a machine for effecting the determination of both static and dynamic unbalance of a rotatable element which is extremely accurate in its indication of the location of an unbalanced condition and which is very simple and inexpensive to construct and operate.

These and other objects of this invention will become apparent from the following detailed description when taken together with the accompanying drawings in which, FIG. 1 is a front elevation of a preferred embodiment of this invention, with a portion thereof cut away;

FIG. 2 is a side elevational view in section of the embodiment of FIG. 1 taken along line 2—2 of FIG. 1;

Figure 3:
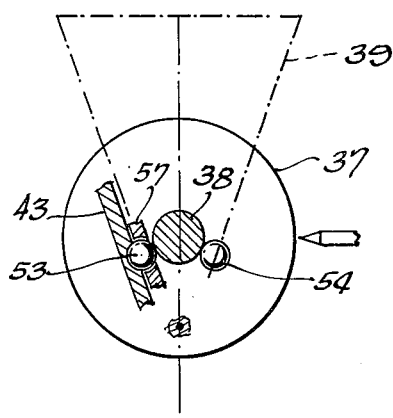
FIG. 3 shows in diagrammatic form a fragment of the embodiment of FIG. 1 as used to determine static balance of an element.

Referring now to FIGS. 1 and 2 for a description of the general organization of the testing device, there is provided a base 10 of suitable width and thickness such as to give the device as a whole the requisite rigidity. The length of the base is calculated to be longer than the longest shaft to be mounted in the device. Mounted on base 10 are spaced vertical standards 11 and 12, which for ease of manufacture may be identical in shape and size. Each said standard 11, 12 in the form chosen to illustrate this invention is provided with a horizontal top section 13, diverging sides 14 and 15 and vertical legs 16 and 17 terminating in shoes 18 and 19. Said shoes 18 and 19 are disposed generally longitudinally of base 10 and are adapted to slide on and be guided by, shoulders 20 and 21 formed in the top surface 22 of base 10 and extending longitudinally thereof in parallel relation with one another.

The vertical standards 11 and 12 are thus adapted to be slid relatively to one another to increase or decrease the spacing therebetween. They are retained on base 10 by headed guide pins 23, 24, the shanks of which 25, 26 ride in relatively close fitting slots 27, 28 and the heads of which ride in the enlarged bottoms 29, 30 of said slots 27, 28. Guide pins 23, 24 extend through suitable openings in the shoes 18, 19 and beyond sufficiently to receive clamping nuts 31, 32. Thus, the location of the vertical standards 11, 12 may be fixed relative to base 10 at a selected location thereon by tightening said clamping nuts 31 and 32.

If desired, for greater stability, further guide means in the form of round rods 33, 34 extending longitudinally of base 10 with their axes parallel to one another and to the shoulders 20 and 21 may be provided, said rods passing through relatively close fitting openings 35, 36 provided therefor in the standards 11, 12, respectively, at any desired height from base 10.

The article to be balanced may be in the form of a cylindrical armature 37 mounted on a shaft 38 which extends coaxially from the ends of the armature 37. The protruding ends of the shaft 38 are supported in cradles 39, 40 which likewise may be identical in size and configuration and may comprise in general a trapezoidal frame having substantially parallel top and bottom sections 41, 42 and downwardly converging sides 43, 44. Said cradles are supported from pins 45, 46 the pointed ends of which are received in conical recesses 47, 48, respectively, in top sections 41, the slant angle of each recess being greater than the slant angle of the points on the pins to provide substantially point contact between the pins and cradles. Said recesses 47, 48 are preferably disposed over the geometric center of the cradles, such that the disposition of the top and bottom of the cradle relative to the vertical standards 11 and 12 can be predetermined. Said pins 45, 46 are mounted, in turn, on horizontally disposed pins 49, 50 extending toward one another from standards 11 and 12, respectively, in which they are held by set screws 51, 52, or the like. Pins 49, 50 are shown as separate elements and as being of circular cross section, but it is understood that other forms may be used and that said pins may in fact be integral portions of the standards 11 and 12.

The support for the shaft 38 in the cradle 39 or 40 is comprised of a pair of balls 53, 54 of precise spherical form and of suitably hard material, said balls being received in opposed shallow sockets 55 and 56 formed in sides 43 and 44, respectively. The balls are held in their respective sockets by plates 57, 58 which have frusto-spherical openings 59 and 60 therein through which said balls extend into contact with shaft 38.

For purposes hereinafter to be described, plates 57 and 58 are made to bear against their respective balls 53 and 54 with variable pressure to vary the degree of freedom of rotation of the balls under the influence of shaft 38 when it is rotated. To this end, each plate is formed with a cam surface 61 and 62 upon which it may rock against the inner surfaces of sides 43 and 44. The cammed ends of the plates are held in the sides 43 and 44 by machine screws 63 and 64 loosely received in suitable openings in the sides 43, 44, respectively. The opposite ends of the plates are held by thumb screws 65, 66 which are free to rotate in suitable openings in said sides 43 and 44. Thus, by turning thumb screws 65, 66, plates 57 and 58 are brought closer to their respective sides 43 and 44, thereby effecting a clamping action upon the balls 53, 54, respectively.

The cradle 40 is provided with an identical ball and friction control for shaft 38 and hence will not be described in detail herein.

Figure 6:
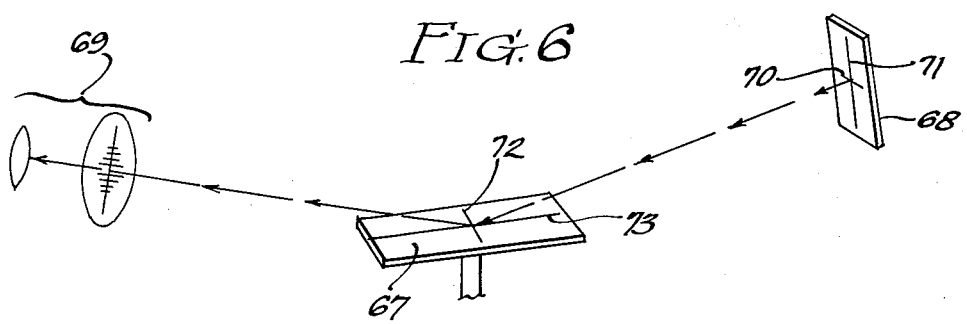
FIG. 6 is a schematic perspective view of the optical system of the embodiment of FIG. 1.

It is contemplated that any unbalance in the armature 37 and shaft 38 will be reflected by a change in the angular positions of the cradles 39 and 40 from the positions assumed by these cradles when empty. The sensibility of the cradles to detect such changes is dependent to a large extent upon the sensitivity of the device used to measure minute angular deflection. The sensing device illustrated herein is a simple mirror system which utilizes a mirror 67 rigidly mounted on a cradle 39 so as to be movable therewith. Fixed to one side of vertical standard 11 is a chart 68, and fixed to the opposite side of standard 11 is an eye-piece 69. Chart 68 has crossed reference lines 70 and 71 marked thereon. Mirror 67 (FIG. 6) has crossed reference lines 72 and 73 marked thereon. Eye-piece 69 has a vertical line 75 and a plurality of horizontal lines 74 marked thereon.

Eye-piece 69 is arranged to view the crossed lines 72, 73, on mirror 67 and the reflection of the crossed reference lines 70, 71 in the mirror 67. It is desirable, though not necessary, that crossed reference lines 70, 71 and 72, 73, coincide when the machine is at rest and without an armature 37 and shaft 38 mounted therein. The lines 74 and 75 on the eye-piece 69 serve to give a quantitative picture of the deviation from coincidence between the crossed lines.

An identical mirror system is provided for cradle 40 and standard 12 and corresponding parts are indicated, wherever necessary, by the same reference characters, but with the prime added.

In the operation of the device, it will be apparent that static balance can be readily determined by placing the shaft and armature in the cradles 39 and 40 and allowing the balls 53, 54, in each cradle to move freely to interpose little or no restraint upon the rotation of shaft 38. If an unbalanced condition exists, it will be manifested by a rotation of the shaft until the center of gravity of the rotating mass is directly below the axis of rotation. Perfect balance is then achieved in the usual manner by drilling out an appropriate amount of material directly below the center of gravity or by adding material in like amount directly above the center of gravity. The mirror system is not necessary for the determination of the static balance.

The dynamic balance can be determined by the following sequence of steps:

The first step is to observe in eye-piece 69 the deviation from coincidence between the crossed reference lines 70, 71 and 72, 73, by noting the number of horizontal lines 74 between the line 72 and the image of line 70 in the mirror 67. This is done before the armature 37 and shaft 38 are placed in cradles 39 and 40, and such readings are taken of the mirror systems for both cradles 39 and 40.

The next step is to place the armature into the cradles 39 and 40 by resting shaft 38 on the balls 53 and 54 for each cradle. Thumb screws 65 and 66, or one of them, are turned in a direction to interpose sufficient friction between the balls and their plates to hold the shaft against movement due to any unbalanced condition existing therein or in the armature. With the armature held against rotation, it becomes a part of the cradles which support it, and in view of the point suspension for each cradle, said cradles will swing until the center of gravity of the combined suspended mass will be immediately below the point of suspension. This swing of the cradles will be readily apparent in the eye-pieces 69 as a change in the location of the reference line 70 with respect to the horizontal lines 74 in the eye-piece 69.

Figure 4:
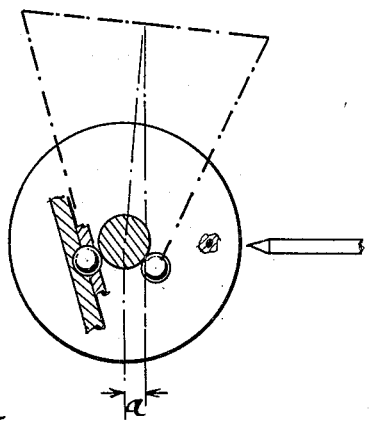
FIG. 4 shows the same fragment of the embodiment of FIG. 1 as used to determine dynamic balance of an element.

The third step is to rotate armature 37 and its shaft 38 on the now stationary balls 53, 54 while observing the reference line 70 in eye-piece 69 until the deviation from the empty condition is a maximum. At this point, the location of the point of maximum unbalance will be on a horizontal line passing through the axis of the shaft, as shown in FIG. 4, and the armature may be marked at this point for the removal of mass therefrom. The deviation from coincidence may not be the same at each cradle but will vary inversely with the axial distance of the unbalance from the cradle, and this relationship may be utilized to determine the point at which material is to be removed. If the deviation is substantially the same at each cradle, it may be assumed that the unbalance occurs substantially half way between the cradles.

The fourth step is to remove mass from the spot indicated from the preceding step and then the said preceding step is repeated to determine whether the amount and location of the removed mass was correct. This step may be repeated several times until both cradles indicate no deviation throughout 360° of revolution of the armature in the cradles 39 and 40.

Figure 5:
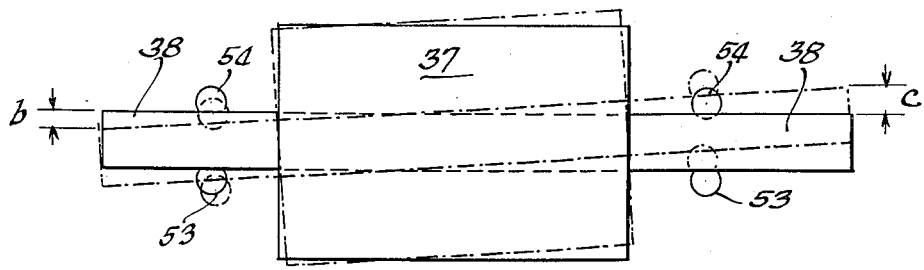
FIG. 5 is a plan view in diagrammatic form of a dynamically unbalanced element as it would appear in the embodiment of FIG. 1.

The dynamic unbalance of the armature and shaft is indicated diagrammatically in plan view in FIG. 5. It may be observed that the swing of the shaft 38 is greater at "C" than at "b," indicating that the unbalance is located nearer the right-hand end of armature 37 (FIG. 5) than at the left-hand end.

The combined static and dynamic balancing machine described above is quite simple to construct and yet is capable of great sensitivity due to the point suspension used for the cradles. The balls at the shaft likewise provide point contact and have the further desirable characteristic of preventing the shaft from binding between the supports therefor as it swings angularly in a horizontal plane to adjust its position to that dictated by the unbalance. The above balancing machine is also simple to operate; it requires very little skill and can be readily operated by one person.

It is understood that the foregoing description is merely illustrative of a preferred embodiment of the invention and that the scope of the invention is not to be limited thereto but is to be determined by the appended claims.

I claim:

1. Apparatus for determining the magnitude and location of dynamic unbalance in an element designed to rotate about a predetermined axis, said apparatus comprising a rigid base, spaced standards mounted on said base, a hanger for each standard, means suspending each hanger from its standard for swinging movement about a vertical axis and a horizontal axis independently of the other hanger, means on the hangers for supporting the element between them and for selectively restraining or permitting rotation of said element about said axis, said hangers being adapted to assume said position relative to said fixed support when said element is supported thereby and is perfectly balanced about a horizontal axis and a second position when said element is turned about its own said axis in said supporting hangers through a predetermined angle other than 180° away from its balanced position, and means for indicating the position of each hanger for the balanced and turned positions of the element.

2. Apparatus for determining the magnitude and location of dynamic unbalance in an element designed to rotate about a predetermined axis and having axially spaced cylindrical regions formed concentrically with respect to said predetermined axis, said apparatus comprising a fixed support, spaced hangers, means mounting said hangers on said support for independent swinging movement about a vertical and a horizontal axis, means on the hangers for supporting the element from the axially spaced cylindrical regions thereon, said last-mentioned means being adapted to hold the said element at any desired angular position with respect to said hangers, said hangers being adapted to assume a first position relative to the said fixed support when said element is supported thereby and is perfectly balanced about a horizontal axis and a second position when said element is turned about its own said axis in said element supporting means through a predetermined angle other than 180° away from its balanced position, and means movable as a function of the movement of each hanger from its first position to its second position to indicate the excursion of each hanger from its first position and thereby give a measure of the unbalance in the element and its location relative to the hangers.

3. Apparatus as described in claim 2, the means on the hangers for supporting the element from the axially spaced cylindrical regions thereon comprising rotatable elements frictionally engaging the said cylindrical regions, and means for resisting rotation of said rotatable elements.

4. Apparatus as described in claim 2, the means on the hangers for supporting the element from the axially spaced cylindrical regions thereon comprising a pair of horizontally spaced spheroidal protuberances allowing for rotational movement of the element thereon about a horizontal axis.

5. Apparatus as described in claim 2, said spheroidal protuberances comprising balls adapted to support the cylindrical regions between them.

6. Apparatus for determining the magnitude and location of dynamic unbalance in an element designed to rotate about a predetermined axis, and having axially spaced cylindrical regions formed concentrically with respect to said predetermined axis, said apparatus comprising a fixed support, spaced hangers, single point suspension means mounting said hangers on said support for independent swinging movement about a vertical and a horizontal axis, each of said hangers including a horizontal upper section and downwardly converging lower sections, said single point suspension cooperating with the horizontal upper section of the hanger; horizontally spaced rotatable balls mounted on the converging lower hanger sections and adapted to support between them the element to be balanced, means for restraining the rotation of the balls, said hangers being adapted to assume a first position relative to the fixed support when said element is supported thereby and is perfectly balanced about a horizontal axis and a second position when said element is turned about its said horizontal axis in said supporting hangers through a predetermined angle other than 180° away from its said balanced position, and means movable as a function of the movement of each hanger for indicating the excursion of each hanger from its said first position and thereby give a measure of the unbalance in the element and its location relative to the hangers.

7. Apparatus as described in claim 6, said indicating means comprising a mirror on the horizontal section of each hanger disposed with its reflecting surface substantially horizontal, a target on the said reflecting surface, a target fixed to the standard upon which the hanger is supported, and optical means fixed to each standard and having reference lines thereon for simultaneously viewing the mirror reflection of the image of the target on the standard and the target on the mirror and comparing the relative locations thereof with respect to the said reference lines.

References Cited in the file of this patent

UNITED STATES PATENTS

| | | |
|---|---|---|
| 1,082,001 | Wilkinson | Dec. 23, 1913 |
| 1,475,848 | Martin | Nov. 27, 1923 |
| 1,529,951 | Hort | Mar. 17, 1925 |
| 1,855,397 | Johnson | Apr. 26, 1932 |
| 2,182,298 | Malmqvist | Dec. 5, 1939 |
| 2,751,262 | Federen et al. | June 19, 1956 |

FOREIGN PATENTS

| | | |
|---|---|---|
| 717,529 | Germany | Feb. 16, 1942 |

UNITED STATES PATENT OFFICE
CERTIFICATE OF CORRECTION

Patent No. 3,008,349 November 14, 1961

Frank J. Winchell et al.

It is hereby certified that error appears in the above numbered patent requiring correction and that the said Letters Patent should read as corrected below.

Column 10, line 34, for "valves" read -- values --; column 13, line 64, after "carrier;" insert -- means for rotating the first input gear forward; --.

Signed and sealed this 1st day of May 1962.

(SEAL)
Attest:

ERNEST W. SWIDER
Attesting Officer

DAVID L. LADD
Commissioner of Patents